US011627560B2

(12) United States Patent
Park

(10) Patent No.: US 11,627,560 B2
(45) Date of Patent: Apr. 11, 2023

(54) METHOD AND APPARATUS FOR TRANSMITTING AND RECEIVING UPLINK CONTROL INFORMATION

(71) Applicant: KT CORPORATION, Gyeonggi-do (KR)

(72) Inventor: Kyujin Park, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 111 days.

(21) Appl. No.: 16/735,625

(22) Filed: Jan. 6, 2020

(65) Prior Publication Data
US 2020/0221448 A1 Jul. 9, 2020

(30) Foreign Application Priority Data

Jan. 7, 2019 (KR) .................. 10-2019-0001959
Apr. 2, 2019 (KR) .................. 10-2019-0038307
Dec. 11, 2019 (KR) .................. 10-2019-0164753

(51) Int. Cl.
*H04W 4/00* (2018.01)
*H04W 72/04* (2023.01)
*H04W 72/0446* (2023.01)
*H04W 76/11* (2018.01)
*H04L 1/1867* (2023.01)
*H04L 1/1812* (2023.01)
*H04W 80/08* (2009.01)

(52) U.S. Cl.
CPC ....... *H04W 72/0413* (2013.01); *H04L 1/1819* (2013.01); *H04L 1/1896* (2013.01); *H04W 72/042* (2013.01); *H04W 72/0446* (2013.01); *H04W 76/11* (2018.02); *H04W 80/08* (2013.01)

(58) Field of Classification Search
CPC . H04L 1/1858; H04L 1/1861; H04L 72/0413; H04L 72/0446
See application file for complete search history.

(56) References Cited

U.S. PATENT DOCUMENTS

2019/0104516 A1* 4/2019 Oh .................. H04L 5/0053
2019/0215126 A1* 7/2019 Choi ................. H04W 72/0413
2020/0145143 A1* 5/2020 Nemeth ............ H04W 72/0406
2021/0211241 A1* 7/2021 Xiong ................ H04L 1/1854
2021/0376987 A1* 12/2021 Liu .................... H04L 1/1854

* cited by examiner

*Primary Examiner* — Bo Hui A Zhu
(74) *Attorney, Agent, or Firm* — Invenstone Patent, LLC

(57) ABSTRACT

Provided are a method and an apparatus for transmitting/receiving uplink control information. The method of a UE for transmitting uplink control information may include receiving configuration information of a slot-based physical uplink control channel (PUCCH) resource set and a subslot-based PUCCH resource set from a base station, receiving information indicating the subslot-based PUCCH resource set from the base station, and repetitively transmitting uplink control information within one slot using an PUCCH resource of the subslot-based PUCCH resource set.

9 Claims, 13 Drawing Sheets

METHOD AND APPARATUS FOR TRANSMITTING AND RECEIVING UPLINK CONTROL INFORMATION

CROSS-REFERENCE TO RELATED APPLICATION

This application claims priority from Korean Patent Application Nos. 10-2019-0001959, 10-2019-0038307 and 10-2019-0164753, respectively filed on Jan. 7, 2019, Apr. 2, 2019 and Dec. 11, 2019, which are hereby incorporated by reference for all purposes as if fully set forth herein.

BACKGROUND OF THE INVENTION

Field of the Invention

These embodiments relate to a method and an apparatus for transmitting and receiving uplink control information in a next-generation radio access network (hereinafter, referred to as new radio (NR)).

Description of Related Art

Recently, $3^{rd}$ generation partnership project (3GPP) has approved "Study on New Radio Access Technology" that is a study item for researches on next-generation radio access technologies (in other words, 5G radio access technologies). On the basis of this, radio access network working group 1 (RAN WG1) introduced designs for new radio (NR), such as a frame structure, channel coding & modulation, waveform & multiple access schemes, and the like. It is required to design the NR to satisfy not only an improved data transmission rate higher than that of LTE but also various QoS requirements required for individual usage scenarios.

The representative usage scenarios of the NR include enhancement Mobile BroadBand (eMBB), massive Machine Type Communication (mMTC), and Ultra Reliable and Low Latency Communications (URLLC). It is required to design frame structures to be more flexible than LTE in order to satisfy requirements of each of the representative usage scenarios.

The individual usage scenarios have different requirements for data rates, latency, reliability, coverage, and the like. Accordingly, as a method for efficiently satisfying the requirements of the individual usage scenarios through a frequency range configuring an NR system, it is necessary to develop a method for efficiently multiplexing radio resource units based on mutually-different numerologies (for example, subcarrier spacing, a subframe, a Transmission Time Interval (TTI), and the like).

As a part of such an aspect, there is a demand for a method for configuring an uplink control channel resource set used for transmitting uplink control information and allocating uplink control channel resources in the uplink control channel resource set in NR.

SUMMARY OF THE INVENTION

According to embodiments of the present disclosure, methods and apparatuses are provided for improving reliability of uplink control channels in accordance with repetitive transmission of uplink control information.

According to one aspect, a method may be provided for transmitting uplink control information using a user equipment (hereinafter, referred as "UE"). The method may include receiving configuration information of a slot-based physical uplink control channel (PUCCH) resource set and a subslot-based uplink control channel resource set from a base station, receiving information indicating the subslot-based uplink control channel resource set from the base station, and repetitively transmitting uplink control information within one slot using an uplink control channel resource of the subslot-based uplink control channel resource set can be provided.

According to another aspect, a method may be provided for receiving uplink control information using a base station. The method may include transmitting configuration information of a slot-based physical uplink control channel (PUCCH) resource set and a subslot-based uplink control channel resource set to a UE, transmitting information indicating the subslot-based uplink control channel resource set to the UE, and repetitively receiving uplink control information within one slot using an uplink control channel resource of the subslot-based uplink control channel resource set.

In addition, according to another aspect, a UE may be provided for transmitting uplink control information. The UE may include a reception unit configured to receive configuration information of a slot-based physical uplink control channel (PUCCH) resource set and a subslot-based uplink control channel resource set from a base station and receive information indicating the subslot-based uplink control channel resource set from the base station; and a transmission unit configured to repetitively transmit uplink control information within one slot using an uplink control channel resource of the subslot-based uplink control channel resource set.

In addition, according to another aspect, a base station may be provided for receiving uplink control information. The base station may include a transmission unit configured to transmit configuration information of a slot-based physical uplink control channel (PUCCH) resource set and a subslot-based uplink control channel resource set to a UE and transmits information indicating the subslot-based uplink control channel resource set to the UE; and a reception unit configured to repetitively receive uplink control information within one slot using an uplink control channel resource of the subslot-based uplink control channel resource set.

The methods and apparatus according to the embodiments of the present disclosure improve reliability of an uplink control channel in accordance with repetitive transmission of uplink control information.

DETAILED DESCRIPTION OF THE INVENTION

Figure 1:
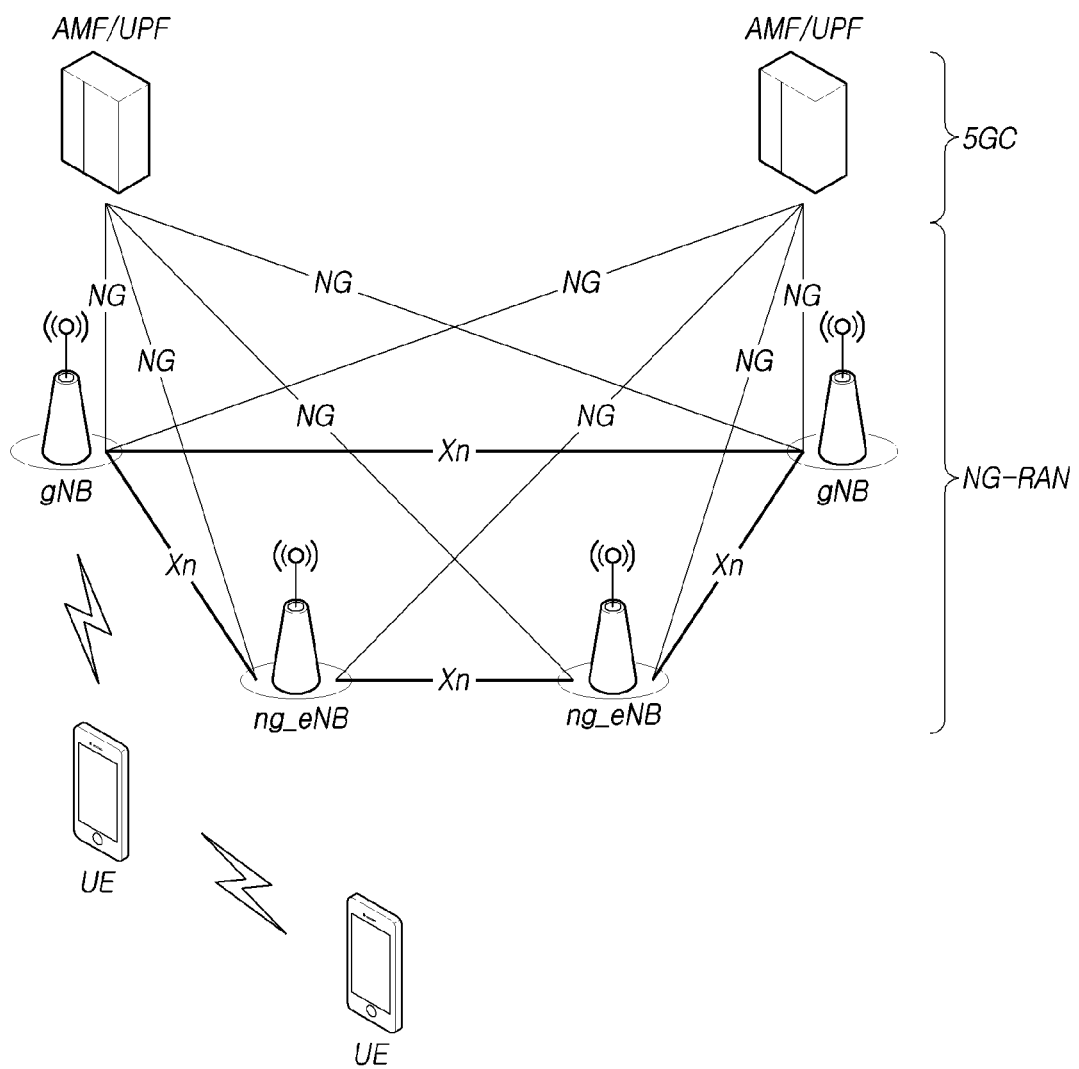
FIG. 1 is a diagram schematically illustrating a structure of an NR radio communication system.

Hereinafter, some embodiments of the present disclosure will be described in detail with reference to the exemplary drawings. In assigning reference signs to constituent elements of the drawings, the same reference numerals may be assigned to the same constituent elements as possibly although they are illustrated in different drawings. In describing these embodiments, in a case in which it is determined that specific description of a related known configuration or function may make the concept of the present technical idea unclear, detailed description thereof may be omitted. In a case in which "comprises", "includes", "has", "is formed" and the like mentioned in here are used, other parts may be added unless "only" is used. In a case in which a constituent element is represented in a singular form, it may include a case in which a plurality thereof are included unless otherwise mentioned explicitly.

In describing constituent elements of the present disclosure, terms such as "first", "second", "A", "B", "(a)", "(b)", and the like may be used. Such terms are only for identifying a specific constituent element from the other constituent elements, and the essence, the sequences, the order, the numbers, and the like of the constituent elements are not limited by the terms.

In description of a positional relation between constituent elements, in a case in which two or more constituent elements are described as being "linked", "combined", "connected", or the like, it should be understood that the two or more constituent elements may be "linked", "combined", or "connected" with another constituent element other than the two or more constituent elements being "interposed" therebetween although they may be directly "linked", "combined", or "connected". Here, the another constituent element may be included in one or more of the two or more constituent elements that are "linked", "combined", or "connected"

In description of a temporal flow relation relating to constituent elements, an operating method, a manufacturing method, and the like, in a case in which an order relation in time or an order relation in a flow is described, for example, using "after", "thereafter", "next", "before", or the like, a non-continuous case may be included therein unless "immediately" or "directly" is used.

In a case in which a numerical value of a constituent element or information corresponding thereto (for example, a level or the like) is mentioned, the numerical value or the information corresponding thereto may be interpreted to include an error range that may occur due to various factors (for example, a factor in the process, an internal or external shock, a noise, and the like) even when there is no additional explicit description.

A radio communication system described here represents a system used for providing various communication services such as a voice service, a data packet service, and the like using radio resources. Such a radio communication system may include a UE and a base station or a core network.

These embodiments to be described below may be applied to a radio communication system using various radio connection technologies. For example, these embodiments may be applied to various radio connection technologies such as a code division multiple access (CDMA), a frequency division multiple access (FDMA), a time division multiple access (TDMA), an orthogonal frequency division multiple access (OFDMA), a single carrier frequency division multiple access (SC-FDMA), a non-orthogonal multiple access (NOMA), and the like. In addition, a radio connection technology may represent not only a specific connection technology but also a communication technology of each generation established by various communication consultative organizations such as 3GPP, 3GPP2, WiFi, Bluetooth, IEEE, ITU, and the like. For example, the CDMA may be realized using a radio technology such as a universal terrestrial radio access (UTRA) or CDMA2000. The TDMA may be realized using a radio technology such as global system for mobile communications (GSM)/general packet radio service (GPRS)/enhanced data rates for GSM evolution (EDGE). The OFDMA may be realized using a radio technology such as institute of electrical and electronics engineers (IEEE) 802.11 (Wi-Fi), IEEE 802.16 (WiMAX), IEEE 802-20, evolved UTRA (evolved UTRA), or the like. IEEE 802.16m is an evolved IEEE 802.16e and provides backward compatibility with a system based on IEEE 802.16e. The UTRA is a part of a universal mobile telecommunications system (UMTS). 3rd generation partnership project (3GPP) long term evolution (LTE) is a part of evolved UMTS (E-UMTS) using an evolved-UMTS terrestrial radio access (E-UTRA) and employs an OFDMA in a downlink and employs an SC-FDMA in an uplink. In this way, these embodiments may be applied to a radio connection technology that is currently disclosed or available in the market or a radio connection technology that is currently under development or will be developed in the future.

Meanwhile, a UE described here has a comprehensive concept representing a device including a radio communication module for communicating with a base station in a radio communication system and should be interpreted to have a concept including not only a user equipment (UE) in WCDMA, LTE, NR, HSPA, and IMT-2020 (5G or new radio) and the like but also a mobile station (MS), a user terminal (UT), a subscriber station (SS), a wireless device, and the like in GSM. In addition, depending on the usage form, a UE may be a user portable device such as a smartphone and may represent a vehicle in a V2X communication system, a device including a radio communication module inside a vehicle, or the like. Furthermore, in the case of a machine-type communication (MTC) system, a UE may represent an MTC terminal, an M2M terminal, an URLLC terminal, or the like having a communication module mounted therein such that machine type communication is performed.

A base station or a cell described here represents an end that communicates with a UE from the viewpoint of a network and comprehensively includes all the various coverage areas such as Node-B, evolved Node-B (eNB), gNode-B (gNB), a Low Power Node (LPN), a sector, a site, antennas having various forms, a base transceiver system (BTS), an access point, a point (for example, a transmission point, a reception point, or a transmission/reception point), a relay node, a mega-cell, a macro-cell, a micro-cell, a pico-cell, a femto cell, a remote radio head (RRH), a radio unit (RU), a small cell, and the like. In addition, a cell may have a meaning including a bandwidth pat (BWP) in a frequency domain. For example, a serving cell may represent an activation BWP of a UE.

Regarding the various cells listed above, a base station may control one or more cells. Accordingly, the base station may be interpreted as two meanings, 1) a device that provides a mega-cell, a macro-cell, a micro-cell, a pico-cell, a femto cell, and a small cell in relation with a radio area or 2) the radio area itself. In 1), the base station may be devices which provide predetermined radio areas and controlled by the same object or the base station may be all the devices interacting with each other to configure a radio area in cooperation. For example, the base station may include a point, a transmission/reception point, a transmission point, a reception point, and the like according to configuration types of radio areas. In 2), the base station may be a radio area in which a UE receives or transmit signals from or to another UE or adjacent base stations.

A cell may represent a coverage of signals transmitted from a transmission/reception point, a component carrier having a coverage of signals transmitted from a transmission/reception point (a transmission point or a transmission/reception point), or the transmission/reception point.

An uplink (UL) represents a channel (e.g., link) from a UE to a base station for data transmission/reception from the UE to the base station. A downlink (DL) represents a communication channel (e.g., communication link) from a base station to a UE for data transmission/reception from the base station to the UE. The downlink may represent communication (e.g., communication path) at a multiplexing transmission/reception point toward a UE. The uplink may represent communication (e.g., communication path) at a UE toward a multiplexing transmission/reception point. In the downlink, a transmitter may be a part of the multiplexing transmission/reception point, and a receiver may be a part of the UE. In addition, in the uplink, a transmitter may be a part of the UE, and a receiver may be a part of the multiplexing transmission/reception point.

The uplink and downlink transmit and receive control information through control channels such as a Physical Downlink Control Channel (PDCCH) and a Physical Uplink Control Channel (PUCCH). The uplink and downlink transmit and receive data by configuring data channels such as a Physical Downlink Shared Channel (PDSCH) and a Physical Uplink Shared Channel (PUSCH).

Hereinafter, a situation in which signals are transmitted and received through channels such as the PUCCH, the PUSCH, the PDCCH, and the PDSCH may be described as "transmitting and receiving the PUCCH, the PUSCH, the PDCCH, and the PDSCH."

In order to clarify description, hereinafter, the present technical idea will be described mainly with reference to a 3GPP LTE/LTE-A/New RAT (NR) communication system. However, the present technical aspects are not limited to the communication system.

The 3GPP develops 5th-generation (5G) communication technologies for satisfying requirements of the next-generation radio connection technology of ITU-R after 4th-generation (4G) communication technologies. More specifically, as 5G communication technologies, the 3GPP develops i) LTE-A pro by improving an LTE-Advanced technology in accordance with requirements of the ITU-R and ii) a new NR communication technology that is separate from the 4G communication technology. Both the LTE-A pro and the NR represent 5G communication technologies. Hereinafter, the 5G communication technology will be described mainly with reference to the NR. As operating scenarios in the NR, various operating scenarios have been defined by adding considerations of satellites, vehicles, a new vertical, and the like to scenarios of the typical 4G LTE, and an Enhanced Mobile Broadband (eMBB), a Massive Machine Communication (mMTC) having a high UE density, expanding in a broad range, and requiring a low date rate and an asynchronous connection, and a Ultra Reliability and Low Latency (URLLC) scenario requiring high responsiveness and reliability and capable of supporting high-speed mobility are supported from the viewpoint of services.

In order to satisfy such scenarios, the NR introduces a radio communication system supporting new waveform and frame structure technologies, a low latency technology, an ultra-high frequency range (mmWave) supporting technology, and a forward compatibility providing technology. Particularly, an NR system includes various technical changes, as compared to typical communication system, from the viewpoint of flexibility for providing forward compatibility. Major technical features of the NR will be described below with reference to the drawings.

<NR System>

FIG. 1 is a diagram schematically illustrating a structure of an NR system.

Referring to FIG. 1, the NR system is divided into a 5G Core Network (5GC) and an NR-RAN part. The NG-RAN includes i) gNBs and ng-eNBs providing user planes (SDAP/PDCP/RLC/MAC/PHY) and ii) a control plane (RRC) protocol end for a user equipment (UE). One gNB is connected to another gNB or an ng-eNB through an Xn interface. The gNBs and the ng-eNBs are connected to the 5GC through NG interfaces. The 5GC may be configured to include an Access and Mobility Management Function (AMF) responsible for control planes of a UE connection and mobility control function and the like and a User Plane Function (UPF) responsible for a user data control function. The NR includes supports for both a frequency range of 6 GHz or less (frequency range 1 (FR1)) and a frequency range of 6 GHz or more (frequency range 2 (FR2)).

The gNB is represents a base station providing an NR user plan and a control plane protocol end for UEs, and the ng-eNB represents a base station providing an E-UTRA user plane and a control plane protocol end for UEs. A base station described here should be understood to have a meaning including the gNB and the ng-eNB and may be used to have a meaning that separately indicates the gNB or the ng-eNB as is necessary.

<NR Waveform, Numerology, and Frame Structure>

In the NR, a CP-OFDM waveform using a cyclic prefix is used for downlink transmission, and a CP-OFDM or a DFT-s-OFDM is used for uplink transmission. An OFDM technology may be easily combined with Multiple Input Multiple Output (MIMO) and has an advantage of being able to use a receiver having a low degree of complexity together with high frequency efficiency.

Since requirements for a data rate, latency, coverage, and the like are different for each of the three scenarios described above in the NR, it is necessary to efficiently satisfy requirements for each scenario through a frequency range configuring an NR system. For this, a technology for efficiently multiplexing radio resources based on a plurality of mutually-different numerologies has been introduced.

More specifically, an NR transmission numerology is determined on the basis of sub-carrier spacing and a cyclic prefix (CP), and, as illustrated in Table 1 below, a µ value is used as an exponential value of "2" using 15 kHz as a reference and is changed exponentially.

TABLE 1

| μ | Subcarrier interval | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
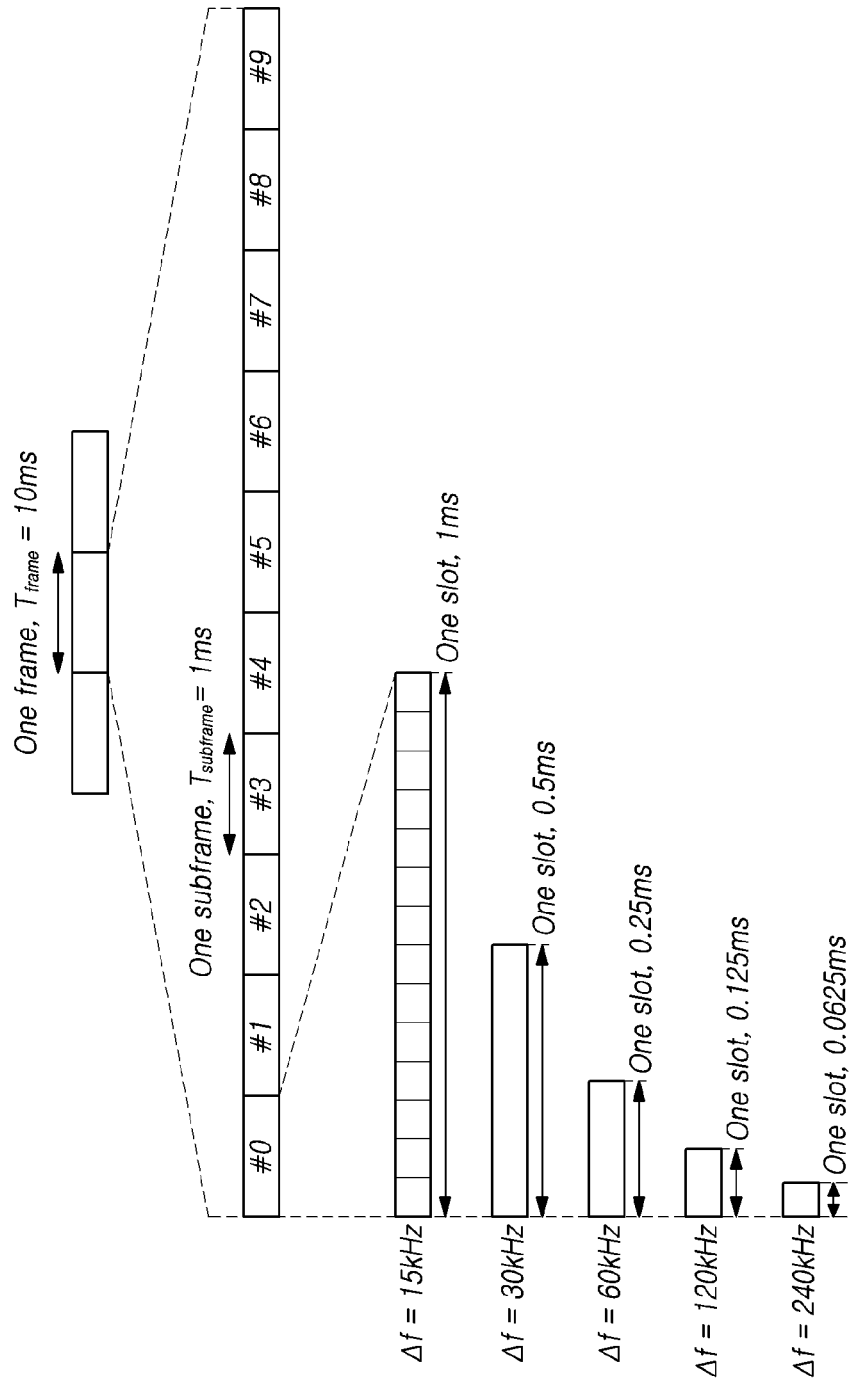
FIG. 2 is a diagram illustrating a frame structure in an NR system.

As in Table 1 presented above, the numerology of the NR may be classified into five types in accordance with sub-carrier spacing. This is different from the LTE, which is one of 4G communication technologies, of which sub-carrier spacing is fixed to 15 kHz. More specifically, in the NR, sub-carrier spacings used for data transmission are 15, 30, 60, and 120 kHz, and sub-carrier spacings used for transmission of a synchronous signal are 15, 30, 120, and 240 kHz. In addition, an extended CP is applied only to the sub-carrier spacing of 60 kHz. As a frame structure in the NR, a frame having a length of 10 ms configured by 10 subframes having the same length of 1 ms is defined. One frame may be divided into half frames having a length of 5 ms, and each half frame includes five subframes. In the case of a subcarrier spacing of 15 kHz, one subframe is configured by one slot, and each slot is configured by 14 OFDM symbols. FIG. 2 is a diagram illustrating a frame structure in an NR system to which this embodiment can be applied.

Referring to FIG. 2, a slot is made up of 14 OFDM symbols in the case of a normal CP, and a length of a slot in the time domain may be different in accordance with a subcarrier spacing. For example, in the case of a numerology having a subcarrier spacing of 15 kHz, a slot has a length of 1 ms and is configured to have the same length as a subframe. Differently from this, in the case of a numerology having a subcarrier spacing of 30 kHz, a slot is made up of 14 OFDM symbols, and two slots may be included in one subframe with a length of 0.5 ms. In other words, a subframe and a frame are defined to have fixed time lengths, a slot is defined using the number of symbols and may have different time lengths in accordance with subcarrier spacings.

In the NR, the basic unit of scheduling is defined as a slot, and mini-slots (or subslots or non-slot based schedules) are introduced for decreasing latency of a radio section. When a wide subcarrier spacing is used, the length of one slot is shortened in inverse proportion thereto. Accordingly, latency in a radio section may be decreased. A mini slot (or a subslot) is used for efficient support for the URLLC scenario and may be scheduled in units of 2, 4, and 7 symbols.

In the NR different from the LTE, allocation of uplink and downlink resources is defined by symbol levels within one slot. In order to decrease an HARQ delay, a slot structure in which HARQ ACK/NACK may be immediately transmitted within a transmission slot is defined, and such a slot structure will be described as a self-contained structure.

The NR is designed to be able to support a total number of 256 slot formats, and 62 slot formats among these are used in 3GPP Rel-15. In addition, a common frame structure configuring an FDD or TDD frame through a combination of various slots is supported. For example, a slot structure in which all the symbols of a slot are set to downlinks, a slot structure in which all the symbols are set to uplinks, and a slot structure in which downlink symbols and uplink symbols are combined are supported. In addition, the NR supports data transmission being scheduled to be distributed to one or more slots. Accordingly, a base station may inform a UE whether a slot is a downlink slot, an uplink slot, or a flexible slot using a slot format indicator (SFI). A base station may direct a slot format by directing an index of a table configured through UE-specific RRC signaling using an SFI and also give a direction dynamically using downlink control information (DCI) or give a direction statically or quasi-statically through an RRC.

<NR Physical Resource>

In the NR, an antenna port, a resource grid, a resource element, a resource block, a bandwidth part, and the like are considered as physical resources.

The antenna port is defined to infer a channel conveying symbols on an antenna port from another channel conveying the other symbols on the same antenna port. In a case of inferring a large-scale property of a channel for conveying symbols on one antenna port from another channel conveying symbols on another antenna port, it may be regarded that the two antenna ports are in a quasi co-located or quasi co-location (QC/QCL) relation. Here, the large-scale property includes one or more of delay spread, Doppler spread, frequency shift, average received power, and received timing.

Figure 3:
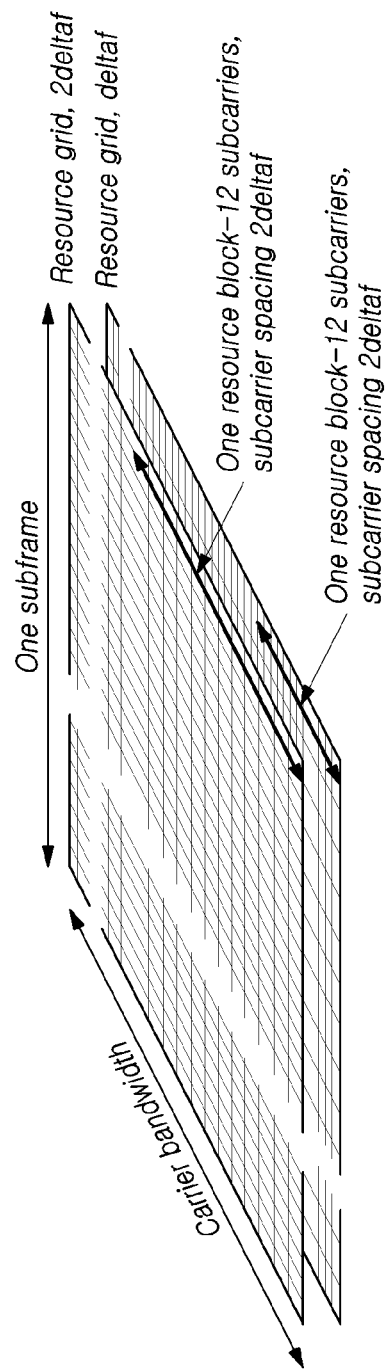
FIG. 3 is a diagram illustrating resource grids supported by a radio connection technology.

FIG. 3 is a diagram illustrating resource grids supported by a radio connection technology to which this embodiment can be applied.

Referring to FIG. 3, as the resource grids, since the NR supports a plurality of numerologies in the same carrier, a resource grid may be present in accordance with each numerology. In addition, a resource grid may be present in accordance with an antenna port, a subcarrier spacing, and a transmission direction.

A resource block is configured by 12 subcarriers and is defined only on the frequency domain. In addition, a resource element is configured by one OFDM symbol and one subcarrier. Accordingly, as illustrated in FIG. 3, a size of one resource block may be different in accordance with a subcarrier spacing. In addition, in the NR, "Point A" performing the role of a common reference point for the resource block grid, a common resource block, a virtual resource block, and the like are defined.

Figure 4:
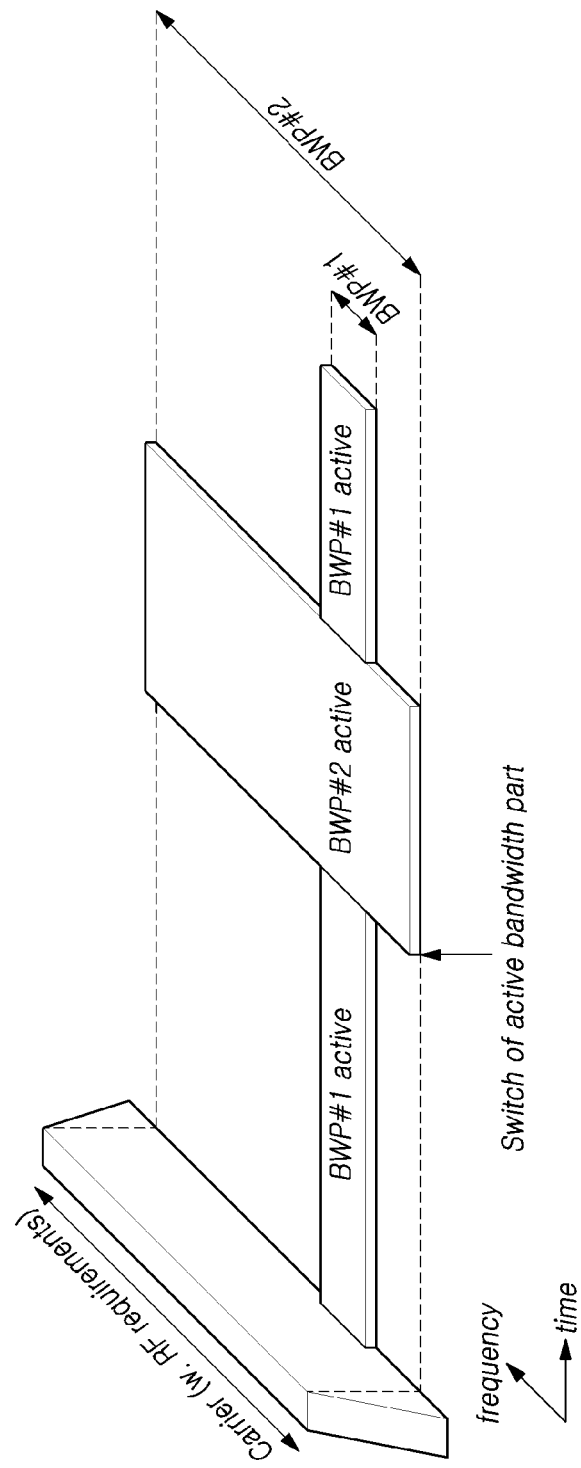
FIG. 4 is a diagram illustrating a bandwidth part supported by a radio connection technology.

FIG. 4 is a diagram illustrating a bandwidth part supported by a radio connection technology to which this embodiment can be applied.

Different from the LTE in which a carrier bandwidth is fixed to 20 Mhz, a maximum carrier bandwidth is set to 50 Mhz to 400 Mhz for each subcarrier spacing in the NR. Accordingly, it is not assumed that all the UEs use all such carrier bandwidths. In accordance with this, in the NR, as illustrated in FIG. 4, a bandwidth part (BWP) may be designated and used by a UE within the carrier bandwidth. The bandwidth part is linked with one numerology, is configured by a subset of continuous common resource blocks, and may be dynamically activated in accordance with a time. In a UE, a maximum of four bandwidth parts are configured for each of the uplink and the downlink, and data is transmitted and received using a bandwidth part that is activated at a given time.

In the case of a paired spectrum, uplink and downlink bandwidth parts are independently set. In the case of an unpaired spectrum, in order to prevent unnecessary frequency re-tuning between downlink and uplink operations, bandwidth parts of the uplink and the downlink are set as a pair such that a center frequency can be shared.

<NR Initial Connection>

In the NR, a UE performs a cell search and a random access process for being connected to a base station and performing communication.

The cell search is a process of a UE for i) being synchronized with a cell of a base station using a synchronization signal block (SSB) transmitted by the base station, ii) acquiring a physical layer cell ID, and iii) acquiring system information.

Figure 5:
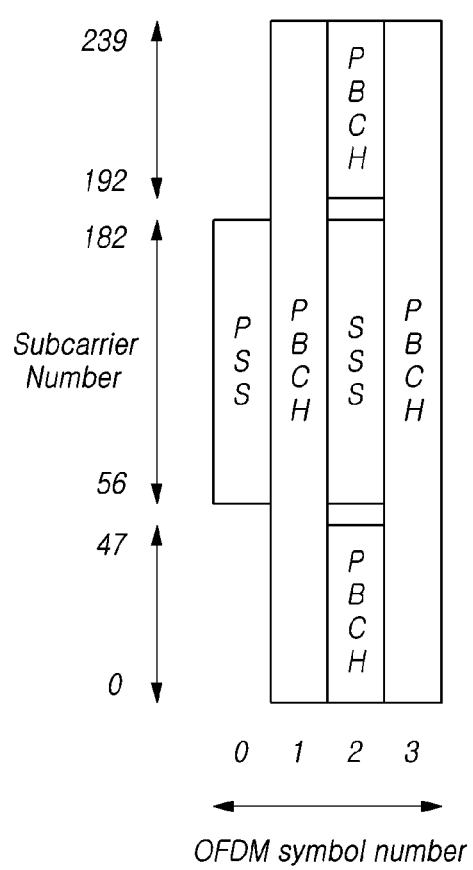
FIG. 5 is a diagram illustrating a synchronization signal block in a radio connection technology.

FIG. 5 is a diagram illustrating a synchronization signal block in a radio connection technology.

Referring to FIG. 5, an SSB includes a primary synchronization signal (PSS) and a secondary synchronization signal (SSS) each occupying one symbol and 127 subcarriers and a PBCH extending over three OFDM symbols and 240 subcarriers.

A UE receives an SSB by monitoring the SSB in the time and frequency domains.

The SSB may be transmitted maximum 64 times for 5 ms. Multiple SSBs are transmitted in mutually-different transmission beams within a time interval of 5 ms, and the UE performs detection by assuming that an SSB is transmitted for every period of 20 ms when one specific beam used for transmission is viewed as a reference. The number of beams used for transmission of SSBs within a time interval of 5 ms may be increased as the frequency range becomes higher. For example, maximum four SSB beams may be transmitted in a frequency range equal to or lower than 3 GHz, and SSBs may be transmitted using maximum 8 beams in a frequency range of 3 to 6 GHz and maximum 64 mutually-different beams for a frequency range equal to or higher than 6 GHz.

Two SSBs are included in one slot. A start symbol and the number of times of repetition within a slot are determined as below in accordance with a subcarrier spacing.

Differently from SS of typical LTE, no SSB is transmitted at the center frequency of a carrier bandwidth. In other words, an SSB may be transmitted at a frequency other than the center of the system band range, and a plurality of SSBs may be transmitted on the frequency domain in a case in which a broadband operation is supported. In accordance with this, the UE monitors an SSB using a synchronization raster that is a candidate frequency position for monitoring SSBs. A carrier raster that is center frequency position information of a channel for initial connection and a synchronization raster are newly defined in the NR, and the synchronization raster has a frequency interval set wider than that of the carrier raster and thus can support a UE's quick SSB search.

The UE may acquire an MIB through the PBCH of the SSB. A master information block (MIB) includes minimum information for the UE to receive the remaining minimum system information (RMSI) that is broadcasted by a network. In addition, the PBCH may include information of a position of the first DM-RS symbol on the time domain, information used for the UE to perform monitoring SIB1 (for example, SIB1 numerology information, information relating to an SIB1 CORESET, search space information, parameter information relating to a PDCCH, and the like), offset information between a common resource block and an SSB (a position of an absolute SSB within a carrier is transmitted through the SIB1), and the like. Here, the SIB1 numerology information is similarly applied also to some messages used in the random access process for a connection to the base station after the UE has completed a cell search process. For example, the numerology information of the SIB1 may be applied to at least one of messages 1 to 4 for the random access process.

The RMSI described above may represent a system information block 1 (SIB1), and the SIB1 is broadcasted periodically (for example, 160 ms) by a cell. The SIB1 includes information required for the UE to perform an initial random access process and is periodically transmitted through the PDSCH. In order for the UE to receive the SIB1, numerology information used for transmitting the SIB1 through the PBCH and control resource set (CORESET) information used for scheduling the SIB1 need to be received. The UE checks scheduling information for the SIB1 using SI-RNTI inside the CORESET and acquires the SIB1 on the PDSCH on the basis of the scheduling information. The remaining SIBs other than the SIB1 may be periodically transmitted or may be transmitted in response to a request from the UE.

Figure 6:
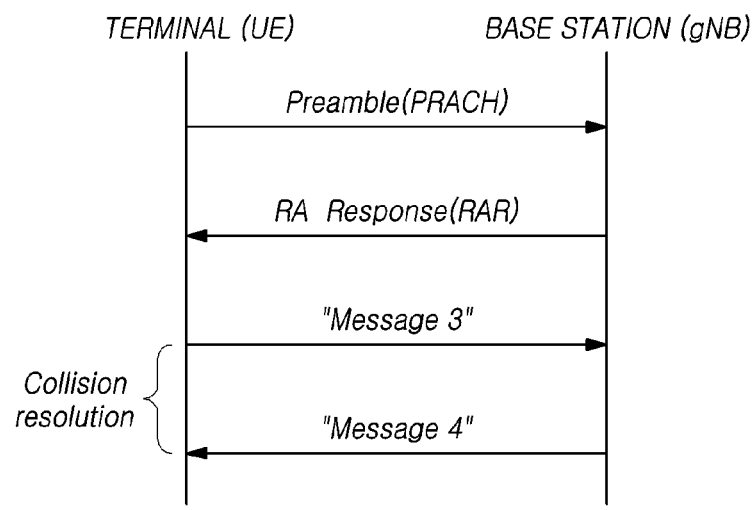
FIG. 6 is a diagram illustrating a random access process in a radio connection technology.

FIG. 6 is a diagram illustrating a random access process in a radio connection technology to which this embodiment can be applied.

Referring to FIG. 6, when a cell search is completed, a UE transmits a random access preamble used for a random access to a base station. The random access preamble is transmitted through a PRACH. More specifically, the random access preamble is transmitted to the base station through a PRACH configured by radio resources that are continuous in a specific slot that is periodically repeated. Generally, a contention-based random access process is performed when a UE initially connects to a cell, and a non-contention based random access process is performed when a random access is performed for beam failure recovery (BFR).

The UE receives a random access response for the transmitted random access preamble. The random access response may include a random access preamble identifier (ID), a UL grant (uplink radio resource), a temporary cell-radio network temporary identifier (C-RNTI), and a time alignment command (TAC). Since random access response information for one or more UEs may be included in one random access response, the random access preamble identifier may be included for giving a notification of a UE for which the RL grant, the temporary C-RNTI, and the TAC that are included are valid. The random access preamble identifier may be an identifier for a random access preamble received by the base station. The TAC may be included as information used for the UE to adjust uplink synchronization. The random access response may be directed using a random access identifier on the PDDCCH, in other words, a random access-radio network temporary identifier (RA-RNTI).

The UE that has received valid random access response processes information included in the random access response and performs scheduled transmission for the base station. For example, the UE applies the TAC and stores the temporary C-RNTI. In addition, the UE transmits data stored in a buffer of the UE or newly-generated data to the base station using the UL grant. In this case, it is necessary to include information for identifying the UE.

Finally, the UE receives a downlink message for contention resolution.

<NR CORESET>

A downlink control channel in the NR is transmitted in a control resource set (CORESET) having a length of 1 to 3 symbols and transmits uplink/downlink scheduling information, a slot format index (SFI), transmit power control (TPC) information, and the like.

In this way, in order to secure flexibility of the system, the concept of the CORESET is introduced to the NR. The control resource set (CORESET) represents a time-frequency resource for a downlink control signal. A UE may decode a control channel candidate using one or more search spaces in CORESET time-frequency resources. A quasi colocation (QCL) assumption is set for each CORESET, and this is used for the purpose of giving a notification of an analog beam direction in addition to delay spread, Doppler spread, a Doppler shift, and an average delay that are properties assumed by a typical QCL.

Figure 7:
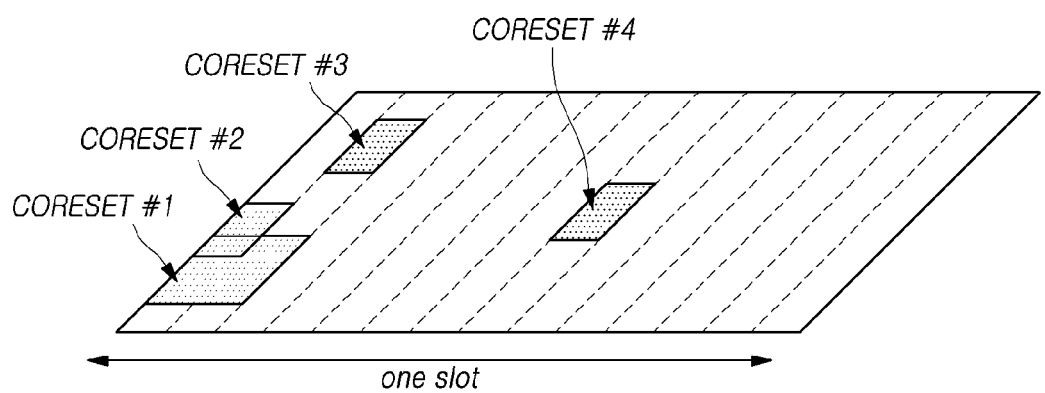
FIG. 7 is a diagram illustrating a CORESET.

FIG. 7 is a diagram illustrating CORESETs.

Referring to FIG. 7, CORESETs may be present in various forms within a carrier bandwidth within one slot, and the CORESET may be configured by maximum three OFDM symbols on the time domain. In addition, the CORESET is defined as a multiple of six resource blocks up to the carrier bandwidth on the frequency domain.

A first CORESET is directed through an MIB in a part of the initial bandwidth part configuration such that additional configuration information and system information can be received from a network. After setting a connection to the base station, the UE may configure a CORESET by receiving one or more pieces of CORESET information through RRC signaling.

In description presented here, a frequency, a frame, a subframe, resources, a resource block, a region, a band, a sub-band, a control channel, a data channel, a synchronization signal, various reference signals, various signals or various messages relating to new radio (NR) may be interpreted to have meanings that were used in the past or are currently used or various meanings that will be used in the future.

New Radio (NR)

The NR is designed to satisfy not only a data transmission rate faster than typical LTE but also various QoS requirements each of usage scenarios. Particularly, representative usage scenarios of the NR may include an enhancement mobile broadband (eMBB), a massive machine type communication (mMTC), and ultra reliable and low latency communications (URLLC). It is necessary to design a frame structure more flexible than that of LTE/LTE-advanced for satisfying requirements for each of usage scenarios.

The usage scenarios have mutually-different requirements for data rates, latency, reliability, coverage, and the like. Accordingly, radio resource units are designed to be efficiently multiplexed based on mutually-different numerologies (for example, subcarrier spacing, a subframe, a TTI, and the like) for efficiently satisfying the requirements of each usage scenarios through a frequency range of a NR system.

As a method for this, there are many discussions conducted and in progress for a method of multiplexing numerologies having different subcarrier spacing values on the basis of TDM, FDM, or TDM/FDM through one or a plurality of NR component carriers and supporting the numerologies and a plan for supporting one or more time units in configuring a scheduling unit in the time domain. In relation to this, in the NR, as one type of time domain structure, a definition for a subframe has been made, and, as a reference numerology for defining a subframe duration, a single subframe duration configured by 14 OFDM symbols of a normal CP overhead based on 15 kHz sub-carrier spacing that is the same as that of the LTE has been determined to be defined. In accordance with this, in the NR, a subframe has a time duration of 1 ms. However, differently from the LTE, in the subframe of the NR, as an absolute reference time duration, slots and mini-slots may be defined as time units that become the base of actual uplink/downlink data scheduling. In such a case, the number of OFDM symbols configuring the corresponding slot, that is a y value is determined to have a value of y=14 regardless of the SCS value in the case of a normal CP.

In accordance with this, a slot is made up of 14 symbols, and all the symbols may be used for downlink (DL) transmission. All the symbols may be used for uplink (UL) transmission, or symbols may be used in the form of "DL portion+gap+UL portion" in accordance with a transmission direction of the slot.

In addition, a mini-slot is defined to be made up of symbols corresponding to a number smaller than the number of symbols of the slot in an numerology (or an SCS), and a time-domain scheduling interval having a short length for uplink/downlink data transmission/reception may be set on the basis of the mini-slot, or a time-domain scheduling interval having a long length for uplink/downlink data transmission/reception may be configured through slot aggregation.

Particularly, in the case of transmission/reception of latency-critical data like a URLLC, in a case in which scheduling is performed in units of slots based on 1 ms (14 symbols) defined in a frame structure based on a numerology having a small SCS value like 15 kHz, it may be difficult to satisfy a latency requirement. Accordingly, a mini-slot configured by OFDM symbols corresponding to a number smaller than the number of OFDM symbols of a slot may be defined for this, and scheduling for latency critical data like the URLLC may be performed on the basis of the mini-slot.

Figure 8:
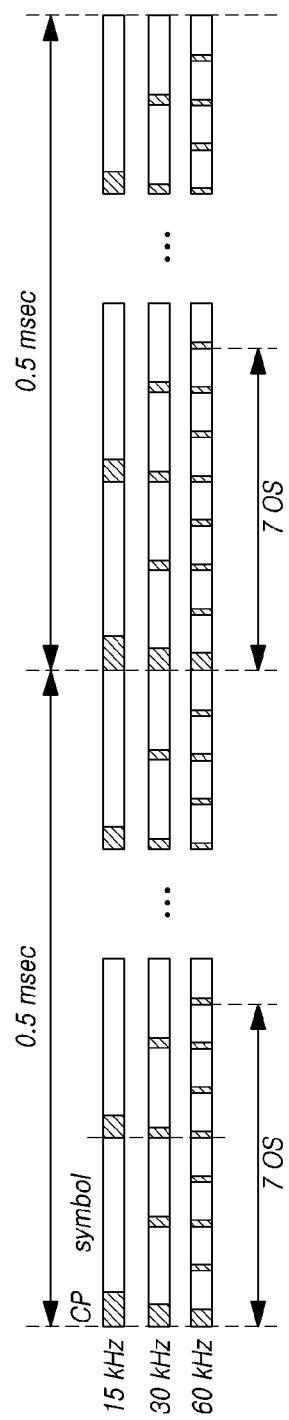
FIG. 8 is a diagram illustrating an example of symbol level alignment among different SCS's.

Alternatively, as described above, a plan in which data is scheduled for matching a latency requirement on the basis of the length of a slot (or a mini-slot) defined for each of the numerologies by multiplexing numerologies having mutually-different SCS values within one NR carrier through a TDM and/or FDM type and supporting the numerologies is also considered. For example, as illustrated in the following FIG. 8, in a case in which an SCS is 60 kHz, the symbol length is decreased to about ¼ of that of a case in which the SCS is 15 kHz. Accordingly, in a case in which one slot is similarly configured by 14 OFDM symbols, a slot length based on 15 kHz becomes 1 ms, and the slot length based on 60 kHz is decreased to about 0.25 ms.

In this way, in the NR, discussions about a method for satisfying requirements of each of the URLLC and the eMBB by defining different SCS's or different TTI lengths have progressed.

Wider Bandwidth Operations

The typical LTE system supports a scalable bandwidth operation for an LTE component carrier (CC). In other words, in configuring one LTE CC in accordance with a frequency deployment scenario that is performed by an LTE company, a bandwidth of a minimum of 1.4 MHz to a maximum of 20 MHz may be configured, and a normal LTE terminal may support a transmission/reception capability of a 20 MHz bandwidth for one LTE CC.

Figure 9:
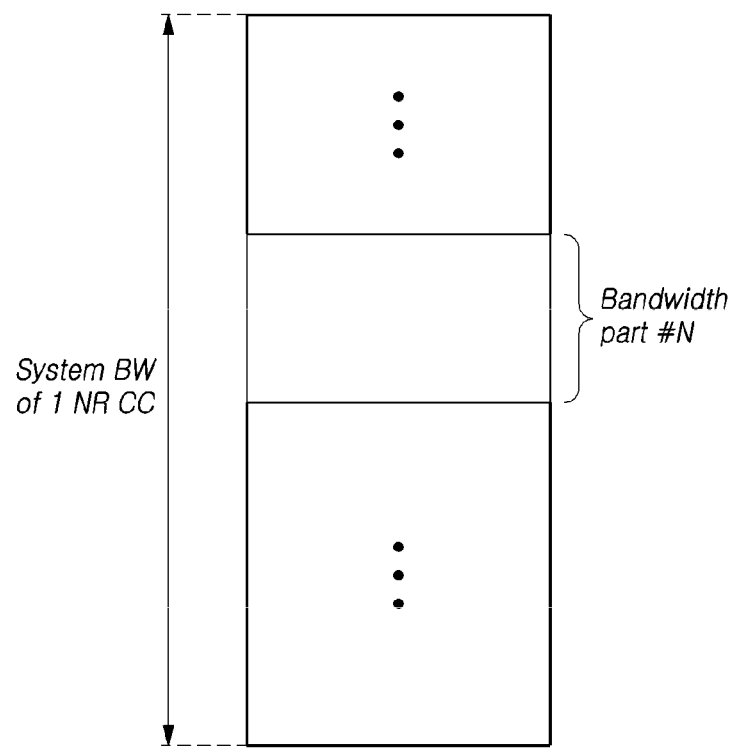
FIG. 9 is a diagram illustrating a conceptual example of a bandwidth part.

However, in the case of the NR, a design is made such that NR terminals having mutually-different transmission/reception bandwidth capabilities may be supported through one wideband NR CC. In accordance with this, as illustrated in FIG. 9, one or more bandwidth parts (BWP) configured by bandwidths finely divided for an NR CC are configured, and a wider bandwidth operation that is flexible through a bandwidth part configuration different for each UE and activation is requested to be supported.

More specifically, in the NR, one or more bandwidth parts may be configured through one serving cell configured from the viewpoint of a UE, and the UE is defined to be used for uplink/downlink data transmission/reception by activating one downlink (DL) bandwidth part and one uplink (UL) bandwidth part in the serving cell. In addition, in a case in which a plurality of serving cells are set in the UE, in other words, also a UE to which a CA is applied is defined to be used for uplink/downlink data transmission/reception using radio resources of the serving cells by activating one downlink bandwidth part and/or one uplink bandwidth part for each of the serving cells.

More specifically, an initial bandwidth part for an initial access process of a UE is defined in an serving cell, one or more UE-specific bandwidth parts are configured through dedicated RRC signaling for each UE, and a default bandwidth part used for a fallback operation can be defined for each UE.

Here, although a plurality of downlinks and/or uplink bandwidth parts may be defined to be simultaneously activated and used in accordance with the capacity of the UE and the bandwidth part configuration in an serving cell, In NR rel-15, only one downlink (DL) bandwidth part and one uplink (UL) bandwidth part are defined to be activated and used at an time in an UE.

HARQ ACK/NACK Feedback Resource Allocating Method

According to a PUCCH resource allocating method for an HARQ ACK/NACK feedback of a UE defined in the NR, a base station configures a PUCCH resource set with one or more PUCCH resources for a UE, and PUCCH resource information to be used for an HARQ ACK/NACK feedback for PDSCH transmission is defined to be indicated through an ACK resource indicator (ARI) information region of the DCI. Here, the PUCCH resource set is configured for each UL BWP for the UE, and additional PUCCH resource sets are defined to be configured in accordance with a payload size of the HARQ ACK/NACK for an UL BWP.

Hereinafter, a method of transmitting/receiving uplink control information will be described more specifically with reference to relating drawings.

Figure 10:
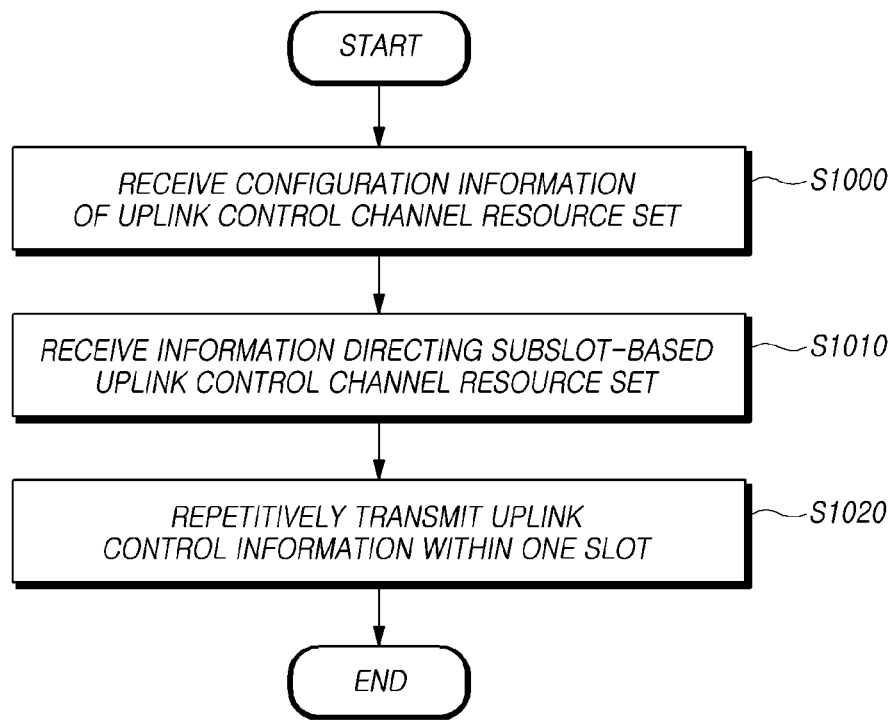
FIG. 10 is a diagram illustrating a method of a UE for transmitting uplink control information according to one embodiment.

FIG. 10 is a diagram illustrating a process of a UE for transmitting uplink control information according to one embodiment.

Referring to FIG. 10, a UE may receive a slot-based uplink control channel (e.g., physical uplink control channel (PUCCH)) resource set and configuration information of a subslot-based uplink control channel resource set from a base station (S1000).

An uplink control channel resource set may be configured to be used for transmitting uplink control information to the UE. For example, in order to transmit HARQ ACK/NACK feedback information for the PDSCH received from the base station, a PUCCH resource set configured by one or more PUCCH resources may be configured for the UE.

For example, separately from the setting of such a PUCCH resource set, a PUCCH resource set for intra-slot PUCCH repetitive transmission (intra-slot PUCCH repetition) may be additionally configured. In other words, in addition to the typical PUCCH resource set (hereinafter, referred to as a "slot-based PUCCH resource set" or a "type-1 PUCCH resource set"), the base station may set a PUCCH resource set (hereinafter, referred to as a "subslot based PUCCH resource set" or a "type-2 PUCCH resource set") for additionally activating the intra-slot PUCCH repetition for the UE through higher layer signaling.

The UE may receive configuration information for the slot-based PUCCH resource set and configuration information of a subslot based PUCCH resource set from the base station. For example, the base station may configure an additional subslot-based PUCCH resource set and transmit the generated subslot-based PUCCH resource set to the UE through higher layer signaling in accordance with whether the PUCCH transmission type of the UE is the typical slot-based PUCCH transmission or the subslot-based PUCCH repetition (or multiplexing PUCCH transmission).

In such a case, the configuration information for the subslot-based PUCCH resource set may additionally include repetition times setting information for transmission of the uplink control information in addition to the PUCCH resource setting information configuring the slot-based PUCCH resource set.

Alternatively, the configuration information for the subslot-based PUCCH resource set may include information of the number of subslots configured within one slot. In other words, the number or the length of the uplink subslots within one slot for a UE may be UE-specifically semi-statically configured. For one intra-slot PUCCH repletion resource setting, additional time section or frequency section allocation information may be included for each intra-slot PUCCH repetition. In other words, for the intra-slot PUCCH repetition, each slot may be divided into subslots, and PUCCH resource allocation information may be configured for each subslot.

For example, in a case the uplink control information is HARQ feedback information, a slot-based uplink control channel resource set and a subslot-based uplink control channel resource set may be configured on the basis of mutually-different HARQ-ACK codebooks. In other words, in order to support different service types of the UE, at least two HARQ-ACK codebooks may be configured at the same time. In this case, parameters within the PUCCH configuration relating to an HARQ-ACK feedback may be configured to be distinguished from each other for the mutually-different HARQ-ACK codebooks. An HARQ-ACK codebook may be identified using a DCI format, an RNTI of the UE, an explicit indication within the DCI, or a CORESET/search space.

Referring back to FIG. 10, the UE may receive information indicating a subslot-based uplink control channel resource set from the base station (S1010).

When the UE performs an HARQ ACK/NACK feedback for the reception of a PDSCH, signaling of activation/deactivation of an intra-slot PUCCH repetition for the improvement of reliability may be performed explicitly or implicitly by the base station.

For example, the UE may receive intra-slot PUCCH repetition indication information through explicit higher layer signaling from the base station as information indicating a subslot-based uplink control channel resource set. For example, the intra-slot PUCCH repetition indication information may be set semi-statically through UE-specific RRC signaling, or the intra-slot PUCCH repetition may be activated or deactivated through MAC CE signaling.

Alternatively, the UE may receive intra-slot PUCCH repetition indication information through a DCI format used for transmitting the PDSCH resource allocation information as information indicating a subslot-based uplink control channel resource set. In other words, an information region used for directing activation/deactivation of the intra-slot PUCCH repetition may be included in a DL assignment DCI format used for transmitting the PDSCH resource allocation information. The base station may dynamically direct activation/deactivation of the intra-slot PUCCH repetition through the information region.

For example, information indicating a subslot-based uplink control channel resource set may be configured on the basis of a downlink control channel search space or a UE radio network temporary identifier (RNTI) and be implicitly indicated. In other words, the UE may receive information relating to a CORESET, a search space, or information relating to a RNTI as information used for indicating a subslot-based uplink control channel resource set.

More specifically, when a CORESET or a search space is configured, setting information for a PUCCH transmission type for PDSCH allocation through the CORESET or the search space may be included. Here, the PUCCH transmission type may be divided into slot-based PUCCH transmission or subslot-based PUCCH transmission. In this case, through this, activation/deactivation of the intra-slot PUCCH repetition may be determined in accordance with the CORESET or the search space through which a DCI format including PDSCH resource allocation information is transmitted.

Alternatively, it may be configured such that the intra-slot PUCCH repetition is activated when an RNTI applied to CRC scrambling of the DCI format including the resource allocation information for the PDSCH is an MCS-C-RNTI. Otherwise, the intra-slot PUCCH repetition is deactivated. Alternatively, by allocating an additional new RNTI used for the activation of the intra-slot PUCCH repetition, PDSCH transmission resource allocation for which activation of the intra-slot PUCCH repetition is necessary may be configured to be transmitted through CRC scrambling based on the new RNTI.

Referring back to FIG. 10, the UE may repetitively transmit uplink control information within one slot by using an uplink control channel resource of the subslot-based uplink control channel resource set (S1020).

For example, in a case the base station indicates PUCCH resource allocation information through a PUCCH resource indicator of the DCI format, the UE may analyze the PUCCH resource allocation information on the basis of the activation/deactivation of the intra-slot PUCCH repetition. In other words, in a case deactivation of the intra-slot PUCCH repetition is indicated or set, the base station may indicate PUCCH resource allocation information on the basis of the type-1 PUCCH resource set. The UE may transmit uplink control information using a PUCCH resource according to this.

Differently from this, in a case activation of the intra-slot PUCCH repetition is indicated or set, the base station may indicate PUCCH resource allocation information on the basis of the new type-2 PUCCH resource set. The UE may repetitively transmit the uplink control information for each subslot configuring one slot by using a PUCCH resource according to this.

Accordingly, of the embodiments shown above improve reliability of an uplink control channel in accordance with repetitive transmission of uplink control information.

Figure 11:
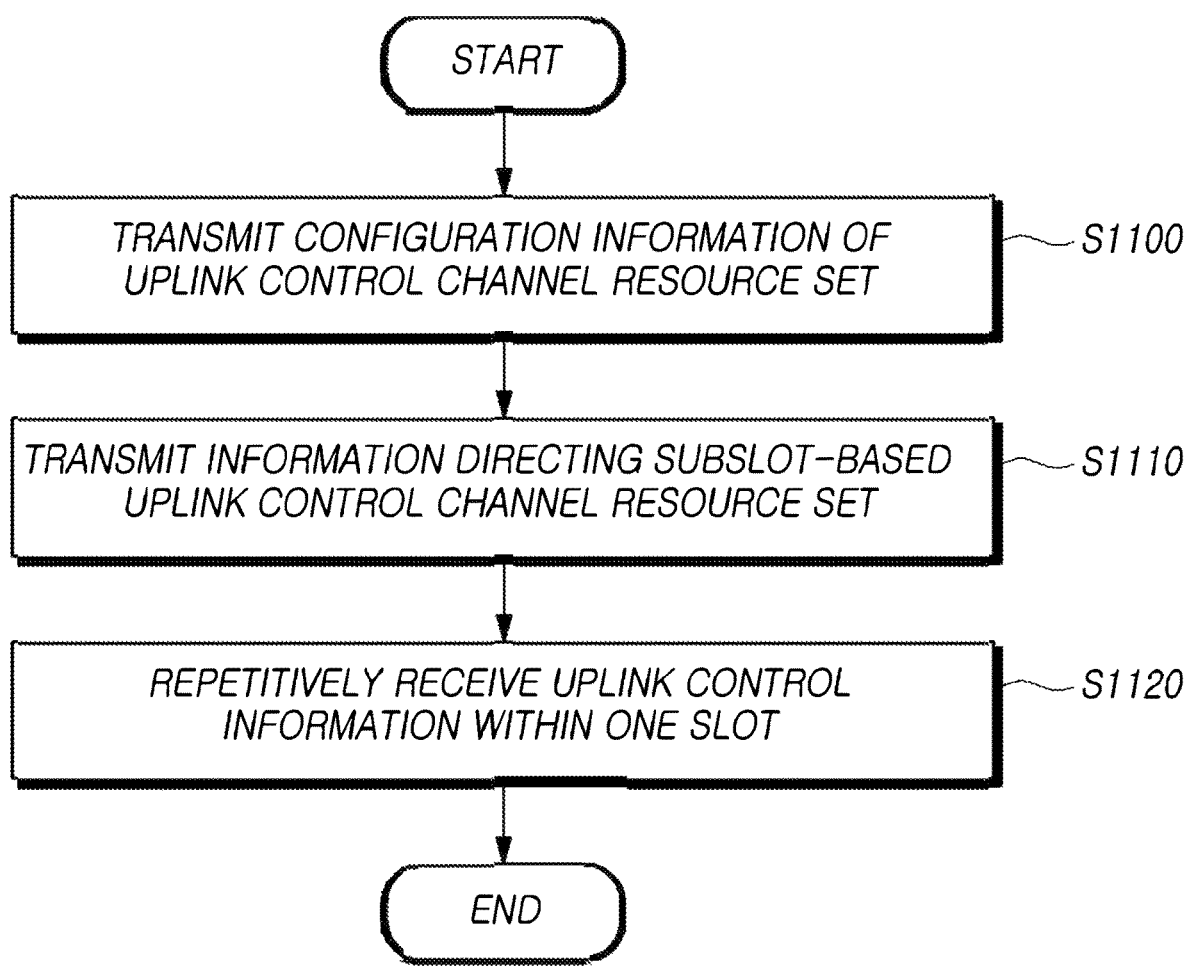
FIG. 11 is a diagram illustrating a method of a base station for receiving uplink control information according to one embodiment.

FIG. 11 is a diagram illustrating a process of a base station for receiving uplink control information using a base station according to one embodiment.

Referring to FIG. 11, the base station may transmit configuration information of a slot-based uplink control channel (e.g., physical uplink control channel (PUCCH)) resource set and a subslot-based uplink control channel resource set to a UE (S1100).

The base station may configure an uplink control channel resource set to be used for transmitting uplink control information to the UE. For example, in order to transmit HARQ ACK/NACK feedback information for a PDSCH received from the base station, a PUCCH resource set configured by one or more PUCCH resources may be configured for the UE.

For example, separately from setting of such a PUCCH resource set, a PUCCH resource set used for an intra-slot PUCCH repetition may be additionally configured. In other words, the base station may additionally set a PUCCH resource set used for activating an intra-slot PUCCH repetition in addition to the typical PUCCH resource set for the UE through higher layer signaling.

The base station may transmit configuration information of the slot-based PUCCH resource set and configuration information of a subslot-based PUCCH resource set to the UE. For example, the base station may configure an additional subslot-based PUCCH resource set in accordance with whether the PUCCH transmission type of the UE is typical slot-based PUCCH transmission or subslot-based PUCCH repetition transmission and transmit the configured subslot-based PUCCH resource set to the UE through higher layer signaling.

In this case, the configuration information of the subslot-based PUCCH resource set may additionally include repetition times setting information for the transmission of the uplink control information in addition to the PUCCH resource setting information configuring the slot-based PUCCH resource set.

Alternatively, the configuration information of the subslot-based PUCCH resource set may include information of the number of subslots configured within one slot. In other words, the number or the length of uplink subslots within one slot for the UE may be UE-specifically semi-statically configured. Additional time section or frequency section allocation information may be included in one intra-slot PUCCH repletion resource setting for each intra-slot PUCCH repetition. In other words, each slot may be divided into subslots for an intra-slot PUCCH repetition, and PUCCH resource allocation information may be configured for each subslot.

For example, in a case the uplink control information is HARQ feedback information, a slot-based uplink control channel resource set and a subslot-based uplink control channel resource set may be configured on the basis of mutually-different HARQ-ACK codebooks. In other words, in order to support different service types of the UE, at least two HARQ-ACK codebooks may be configured at the same time. In this case, parameters within the PUCCH configuration relating to an HARQ-ACK feedback may be configured to be distinguished from each other for the mutually-different HARQ-ACK codebooks. An HARQ-ACK codebook may be identified using a DCI format, an RNTI of the UE, an explicit indication within the DCI, or a CORESET/search space.

Referring back to FIG. 11, the base station may transmit information indicating a subslot-based uplink control channel resource set to the UE (S1110).

For, the base station may transmit intra-slot PUCCH repetition indication information to the UE through explicit higher layer signaling as the information indicating a subslot-based uplink control channel resource set. For example, the base station may semi-statically set the intra-slot PUCCH repetition indication information through UE-specific RRC signaling or may activate or deactivate an intra-slot PUCCH repetition through MAC CE signaling.

Alternatively, the base station may transmit intra-slot PUCCH repetition indication information through a DCI format used for transmitting the PDSCH resource allocation information as information indicating a subslot-based uplink control channel resource set. In other words, an information region used for indicating activation/deactivation of the intra-slot PUCCH repetition may be included in a DL assignment DCI format used for transmitting the PDSCH resource allocation information. The base station may dynamically indicate activation/deactivation of the intra-slot PUCCH repetition through the information region.

For example, information indicating a subslot-based uplink control channel resource set may be configured on the basis of a downlink control channel search space or a UE radio network temporary identifier (RNTI) and be implicitly indicated. In other words, the base station may transmit information relating to a CORESET, a search space, or information relating to a RNTI as information indicating a subslot-based uplink control channel resource set.

More specifically, when a CORESET or a search space is configured, setting information for a PUCCH transmission type for PDSCH allocation through the CORESET or the search space may be included. Here, the PUCCH transmission type may be divided into slot-based PUCCH transmission or subslot-based PUCCH transmission. In this case, through this, activation/deactivation of the intra-slot PUCCH repetition may be determined in accordance with the CORESET or the search space through which a DCI format including PDSCH resource allocation information is transmitted.

Alternatively, it may be configured such that the intra-slot PUCCH repetition is activated when an RNTI applied to CRC scrambling of the DCI format including the resource allocation information for the PDSCH is an MCS-C-RNT. Otherwise, the intra-slot PUCCH repetition is deactivated. Alternatively, by allocating an additional new RNTI used for the activation of the intra-slot PUCCH repetition, PDSCH transmission resource allocation for which activation of the intra-slot PUCCH repetition is necessary may be configured to be transmitted through CRC scrambling based on the new RNTI.

Referring back to FIG. 11, the base station may repetitively receive uplink control information within one slot by using an uplink control channel resource of the subslot-based uplink control channel resource set (S1120).

For example, when the base station indicates PUCCH resource allocation information through a PUCCH resource indicator of the DCI format, the UE may analyze the PUCCH resource allocation information on the basis of the activation/deactivation of the intra-slot PUCCH repetition. In other words, when deactivation of the intra-slot PUCCH repetition is indicated or set, the base station may indicate PUCCH resource allocation information on the basis of the type-1 PUCCH resource set. In accordance with this, the base station may receive uplink control information transmitted by the UE using a PUCCH resource.

Differently from this, when activation of the intra-slot PUCCH repetition is indicated or set, the base station may indicate PUCCH resource allocation information on the basis of the new type-2 PUCCH resource set. In accordance with this, the base station may repetitively receive the uplink control information that has been repetitively transmitted for each subslot within one slot by the UE using the PUCCH resource.

As described, the method and an apparatus according to the embodiments of the present disclosure improve reliability of an uplink control channel in accordance with repetitive transmission of uplink control information.

Hereinafter, each embodiment relating to a configuration and allocation of radio resources for repetitive transmission of the uplink control information based on a subslot within one slot will be described more specifically with reference to relating drawings.

The present disclosure introduces a PUCCH resource allocating method for repetitively transmitting a UCI through one slot in an NR system.

As described above, a PUCCH resource used for transmitting HARQ ACK/NACK feedback information for the reception of a PDSCH of a UE in the NR is indicated through a PUCCH resource indicator information region of the DCI format including the PDSCH resource allocation information. More specifically, maximum four PUCCH resource sets for a UE may be set by a base station, and each of the PUCCH resource sets may be configured by maximum 16 PUCCH resources. In addition, a PUCCH resource for an HARQ ACK/NACK feedback for reception of a PDSCH in a UE is allocated through a PUCCH resource indicator and implicit mapping.

In the NR, it is required to improve reliability of uplink data and a control channel and downlink data and a control channel used for providing an URLLC service. Accordingly, as a method for improving the reliability of a PUCCH that is an uplink control channel, the present disclosure introduces a method for repetitively transmitting uplink control information through one slot. In particular, the present disclosure introduces a PUCCH resource allocating method for applying intra-slot PUCCH repetition in which the same UCI is repetitively transmitted through a single slot for improving reliability of the uplink control channel.

Embodiment 1. Definition of Intra-Slot PUCCH Repetition Indication

When a UE performs an HARQ ACK/NACK feedback for the reception of a PDSCH, the base station may explicitly or implicitly define signaling of activation/deactivation of an intra-slot PUCCH repetition for improving reliability.

More specifically, signaling of the intra-slot PUCCH repetition indication information may be explicitly performed. For example, the intra-slot PUCCH repetition indication information may be semi-statically set through UE-specific RRC signaling.

As another example, the intra-slot PUCCH repetition indication information may indicate activation of an intra-slot PUCCH repetition or deactivation of an intra-slot PUCCH repetition through MAC control element (CE) signaling.

In addition, as further another example, the intra-slot PUCCH repetition indication information may be transmitted through a DCI format used for transmitting PDSCH resource allocation information. In other words, through the DL assignment DCI format used for transmitting PDSCH resource allocation information, an information region for indicating activation/deactivation of the intra-slot PUCCH repetition, for example, an intra-slot PUCCH repetition indicator is defined to be included, and activation/deactivation of an intra-slot PUCCH repetition may be defined to be indicated by the base station through this.

Alternatively, signaling of the intra-slot PUCCH repetition indication information may be performed implicitly. For example, activation/deactivation of the intra-slot PUCCH repetition may be determined in accordance with an PDSCH transmission duration. For example, when the PDSCH transmission is slot-based transmission or aggregated slot-based transmission, the intra-slot PUCCH repetition may be configured to be deactivated. Differently from this, when the PDSCH transmission is non-slot based transmission such as transmission based on mini-slots such as 2, 4, and 7 symbols that are units smaller than one slot, the intra-slot PUCCH repetition may be defined to be activated.

In addition, as another example, when a CORESET or a search space is configured, setting information of a PUCCH transmission type for PDSCH allocation through the corset or the search space may be configured to be included. Here, the PUCCH transmission type may be divided into typical slot-based PUCCH transmission or a subslot-based PUCCH transmission for activating an intra-slot PUCCH repetition. In this case, through this, activation/deactivation of the intra-slot PUCCH repetition may be defined to be determined in accordance with the CORESET or the search space through which a DCI format including PDSCH resource allocation information is transmitted.

In addition, as another example, it may be defined to activate the intra-slot PUCCH repetition is activated when a radio network temporary identifier (RNTI) applied to CRC scrambling of the DCI format including the resource allocation information for the PDSCH is an MCS-C-RNTI. Otherwise, it may be defined to deactivate the intra-slot PUCCH repetition. Alternatively, by allocating an additional new RNTI used for the activation of the intra-slot PUCCH repetition, PDSCH transmission resource allocation for which activation of the intra-slot PUCCH repetition is necessary may be defined to be transmitted through CRC scrambling based on the new RNTI.

In addition, remaining examples acquired by excluding the examples through the UE-specific higher layer signaling among the intra-slot PUCCH repetition applying methods described above may be applied in a hybrid form together with the higher layer signaling setting method. In other words, activation/deactivation of an intra-slot PUCCH repetition is set first for each UE or in units of cells through UE-specific or cell-specific higher layer signaling by the base station, and activation/deactivation of an intra-slot PUCCH repetition may be defined to be indicated secondarily using the methods described above in accordance therewith.

For example, in the case of an indication method performed through an intra-slot PUCCH repetition indicator of the DCI format, i) activation/deactivation of an intra-slot PUCCH repetition is primarily set through the UE-specific or cell-specific higher layer signaling, and ii) inclusion/non-inclusion of an intra-slot PUCCH repetition indicator information region within the DCI format may be determined in accordance therewith. In this case, when the inclusion of the intra-slot PUCCH repetition indicator information region inside the DCI format is set through the higher layer signaling, the base station may be defined to dynamically performing signaling of activation/deactivation of an intra-slot PUCCH repetition secondarily through the intra-slot PUCCH repetition indicator. Likewise, the description presented above may be similarly applied to a MAC CE signaling method or an implicit signaling method.

Embodiment 2. Intra-Slot PUCCH Repetition Method

In a case in which the intra-slot PUCCH repetition is activated in accordance with Embodiment 1 described above, it is necessary to define a PUCCH resource allocating method using repetitive transmission through a single slot. However, the following description may be applied in substantially the same manner to a case in which an intra-slot PUCCH repetition is applied using a method other than that of Embodiment 1. For example, a PUCCH resource set for an intra-slot PUCCH repetition may be defined to be set separately from the setting of the typical PUCCH resource set. In other words, through higher layer signaling, in addition to an typical PUCCH resource set (for example, a type-1 PUCCH resource set) to which an intra-slot PUCCH repetition is deactivated for a UE, a PUCCH resource set (for example, a type-2 PUCCH resource set) used for activating an intra-slot PUCCH repetition may be additionally defined to be set by the base station.

In this case, the base station indicates PUCCH resource allocation information through a PUCCH resource indicator of the DCI format. In analyzing this using the UE, when an intra-slot PUCCH repetition is indicated or set to be deactivated depending on activation/deactivation of an intra-slot PUCCH repetition, PUCCH resource allocation information may be configured to be indicated by the base station on the basis of the type-1 PUCCH resource set and be analyzed by the UE. To the contrary, when an intra-slot PUCCH repetition is indicated or set to be activated, PUCCH resource allocation information may be defined to be indicated by the base station on the basis of a new type-2 PUCCH resource set and be analyzed by the UE.

In addition, the setting information of PUCCH resources configuring the type-2 PUCCH resource set may be defined to additionally include repetition times setting information or include time section or frequency section allocation information for one intra-slot PUCCH repletion resource setting for each intra-slot PUCCH repetition in addition to the PUCCH resource setting information configuring the type-1 PUCCH resource set. In other words, for an intra-slot PUCCH repetition, each slot may be divided into subslots, and the PUCCH resource allocation information may be configured for each of the subslots.

As another example, the intra-slot PUCCH repetition may be defined to be activated on the basis of PUCCH resources configuring a PUCCH resource set that has already been allocated. In this case, as functions of time section resource allocation information of a PUCCH resource indicated through the PUCCH resource indicator and the number of uplink symbols configuring a slot in which PUCCH is transmitted, the number of times of repetitions of the PUCCH and symbol resources for which repetitions are performed may be defined to be determined.

Alternatively, in addition to the PUCCH resource indicator acquired through the DCI, signaling of the intra-slot repetition times information may be defined to be additionally performed by the base station. In this case, symbol resources for which the repetition is performed may be defined to be determined in accordance with i) the time section resource allocation information of a PUCCH resource indicated through a PUCCH resource indicator, ii) the number of uplink symbols configuring a slot in which the PUCCH is transmitted, and iii) the indicated intra-slot repetition times information. Here, inclusion/non-inclusion of the intra-slot repetition times indication information region through the DCI format may be determined in accordance with setting/non-setting of an intra-slot PUCCH repetition according to Embodiment 1 described above or may be set through UE-specific or cell-specific higher layer signaling using the base station.

Hereinafter, a method of applying PUCCH resource allocation for an ACK/NACK feedback transmission for the reception of a PDSCH in the UE will be described more specifically on the basis of details proposed in Embodiment 1 and Embodiment 2 described above. First, in accordance with the specific PUCCH resource set configuring method presented in Embodiment 2, PUCCH resource sets of mutually-different types may be configured for a UE by a base station/network. In other words, in configuring a PUCCH resource set for a UE by a base station/network, an additional PUCCH resource set may be configured in accordance with a service type or a PDSCH group according thereto and a PUCCH transmission type according thereto, in other words, the transmission is typical slot-based PUCCH transmission or subslot-based PUCCH transmission for intra-slot PUCCH repetition/multiple PUCCH transmission, and the configured PUCCH resource sets may be transmitted to respective UEs through higher layer signaling.

Here, a specific example of dividing the service type is a case in which PDSCH transmission is divided into PDSCH transmission for providing an eMBB service and PDSCH transmission for providing an URLLC service. PDSCH groups represent groups into which PDSCH transmission is divided in accordance with a service type to which the PDSCH transmission belongs (in other words, that is provided by the PDSCH transmission) as a method for dividing a service type of PDSCH transmission in a physical layer or higher layer levels such as an MAC layer, RLC, RDCP/RRC, and the like in accordance with the service type in an air interface configuring a radio access network (RAN). Accordingly, a PDSCH group ID may be defined for PDSCH transmission, and, in accordance with a PDSCH group ID value, a service type to which PDSCH transmission belongs and a requirement according thereto or, as described above, a PUCCH transmission type for an HARQ ACK/NACK feedback for the PDSCH transmission and a type of PUCCH resource set of Embodiment 2 that is a PUCCH resource set configuration according thereto, and the like may be identified.

Accordingly, as presented in Embodiment 2, when PUCCH resource set configurations of mutually-different types are formed for a UE, in a case in which the explicit or implicit setting/indicating method through RRC signaling, MAC CE signaling or L1 control signaling presented in Embodiment 1 is applied as a method for setting/indicating a PUCCH resource set type to be applied for an HARQ ACK/NACK feedback in the UE for PDSCH transmission, the setting/indicating information may be defined as information for directly setting/indicating a PUCCH resource type presented in Embodiment 1, or information for setting/indicating a PDSCH group, a service type, and the like is defined and an indirect setting/indicating method through this may be also used.

In other words, when a PUCCH resource set of Embodiment 2 is configured, the setting of PUCCH resource sets for one or more types may be applied as a form in which a PUCCH resource set is configured for each of one or more PDSCH groups, a form in which a PUCCH resource set is configured for each service type, or a form in which a PUCCH resource set is configured for each slot-based or subslot-based PUCCH transmission type. In this case, the explicit or implicit indication method through the RRC signaling, the MAC CE signaling, or the L1 control signaling proposed in Embodiment 1 may be also be applied in the form of a PDSCH group indication, a service type indication, or a slot/subslot PUCCH transmission type indication, or the like.

As described, the method and apparatus according to the embodiments of the present disclosure may improve reliability of an uplink control channel in accordance with repetitive transmission of uplink control information.

Hereinafter, structures of a reception UE and a transmission UE capable of performing some or all the embodiments described with reference to FIGS. 1 to 11 will be described with reference to drawings.

Figure 12:
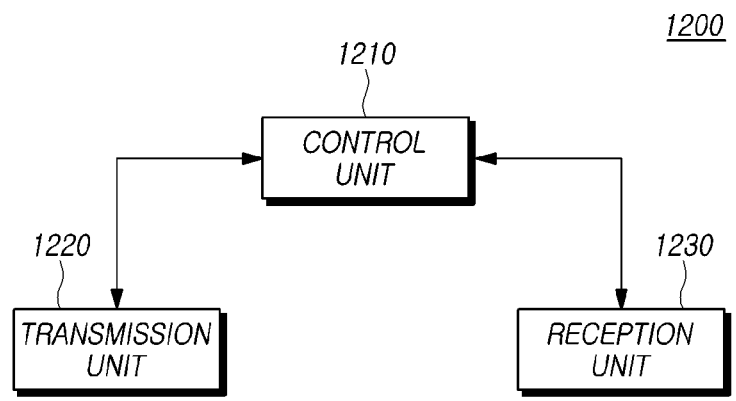
FIG. 12 is a diagram illustrating a UE according to an embodiment.

FIG. 12 is a diagram illustrating a UE (1200) according to an embodiment.

Referring to FIG. 12, the UE 1200 according to an embodiment includes a control unit 1210, a transmission unit 1220, and a reception unit 1230.

The control unit 1210 controls an overall operation of the reception UE 1200 according to a method of transmitting uplink control information using a UE required for performing the present invention described above. The transmission unit 1220 transmits uplink control information, data, and a message to a base station through an applicable channel. The reception unit 1230 receives downlink control information, data, a message, and the like from the base station through an applicable channel.

The reception unit 1230 may receive configuration information of a slot-based PUCCH resource set and a subslot-based PUCCH resource set from the base station. An uplink control channel resource set may be configured to be used for transmitting uplink control information to a UE. For example, separately from the setting of such a PUCCH resource set, a PUCCH resource set may be additionally configured to be used for an intra-slot PUCCH repetitive transmission. In other words, the base station may additionally set a PUCCH resource set used for activating an intra-slot PUCCH repetition in addition to an typical PUCCH resource set for a UE through higher layer signaling.

The reception unit 1230 may receive configuration information of a slot-based PUCCH resource set and configuration information of a subslot-based PUCCH resource set from the base station. For example, the base station may configure an additional subslot-based PUCCH resource set and transmit the configured subslot-based PUCCH resource set to the UE through higher layer signaling in accordance with whether the PUCCH transmission type of the UE is the typical slot-based PUCCH transmission or the subslot-based PUCCH repetitive transmission.

In this case, the configuration information of the subslot-based PUCCH resource set may additionally include repetition times setting information for the transmission of uplink control information in addition to the PUCCH resource setting information configuring the slot-based PUCCH resource set.

Alternatively, the configuration information of the subslot-based PUCCH resource set may include information of the number of subslots configured within one slot. In other words, the number or the length of uplink subslots within one slot may be UE-specifically and semi-statically configured for the UE. For one intra-slot PUCCH repletion resource setting, additional time section or frequency section allocation information may be included for each intra-slot PUCCH repetition. In other words, for an intra-slot PUCCH repetition, each slot may be divided into subslots, and PUCCH resource allocation information may be configured for each subslot.

The reception unit 1230 may receive information indicating a subslot-based uplink control channel resource set from the base station.

For example, the reception unit 1230 may receive intra-slot PUCCH repetition indication information as the information indicating a subslot-based uplink control channel resource set from the base station through explicit higher layer signaling. For example, the intra-slot PUCCH repetition indication information may be semi-statically set through UE-specific RRC signaling or may be activated or deactivated through MAC CE signaling.

Alternatively, the reception unit 1230 may receive intra-slot PUCCH repetition indication information as the information indicating a subslot-based uplink control channel resource set through a DCI format used for transmitting the PDSCH resource allocation information. In other words, an information region used for indicating activation/deactivation of an intra-slot PUCCH repetition may be included in a DL assignment DCI format used for transmitting the PDSCH resource allocation information. The base station may dynamically indicate activation/deactivation of an intra-slot PUCCH repetition through the information region.

For example, the information indicating a subslot-based PUCCH resource set may be configured on the basis of a downlink control channel search space or a RNTI and be implicitly indicated. In other words, the reception unit 1230 may receive information relating to a CORESET, a search space, or a RNTI as the information indicating a subslot-based uplink control channel resource set.

More specifically, when a CORESET or a search space is configured, setting information of a PUCCH transmission type for PDSCH allocation through the CORESET or the search space may be included. Here, the PUCCH transmission type may be divided into slot-based PUCCH transmission or subslot-based PUCCH transmission. In this case, through this, activation/deactivation of the intra-slot PUCCH repetition may be determined in accordance with the CORESET or the search space through which a DCI format including PDSCH resource allocation information is transmitted.

Alternatively, it may be configured such that the intra-slot PUCCH repetition is activated when an RNTI applied to CRC scrambling of the DCI format including the resource allocation information for the PDSCH is an MCS-C-RNTI. Otherwise, the intra-slot PUCCH repetition is deactivated. Alternatively, by allocating an additional new RNTI used for the activation of the intra-slot PUCCH repetition, PDSCH transmission resource allocation for which activation of the intra-slot PUCCH repetition is necessary may be configured to be transmitted through CRC scrambling based on the new RNTI.

The transmission unit 1220 may repetitively transmit uplink control information within one slot using a PUCCH resource of the subslot-based PUCCH resource set.

For example, in a case in which the base station indicates PUCCH resource allocation information through the PUCCH resource indicator of the DCI format, the control unit 1210 may analyze the PUCCH resource allocation information on the basis of activation/deactivation of an intra-slot PUCCH repetition. In other words, in a case in which deactivation of an intra-slot PUCCH repetition is indicated or set, the base station may indicate PUCCH resource allocation information on the basis of a type-1 PUCCH resource set. The transmission unit 1220 may transmit uplink control information using a PUCCH resource according thereto.

Differently from this, in a case in which activation of an intra-slot PUCCH repetition is indicated or set, the base station may indicate PUCCH resource allocation information on the basis of a new type-2 PUCCH resource set. The transmission unit 1220 may repetitively transmit uplink control information for each subslot configuring one slot using a PUCCH resource according thereto.

As described, the method and apparatus according to the embodiments of the present disclosure improve reliability of an uplink control channel in accordance with repetitive transmission of uplink control information.

Figure 13:
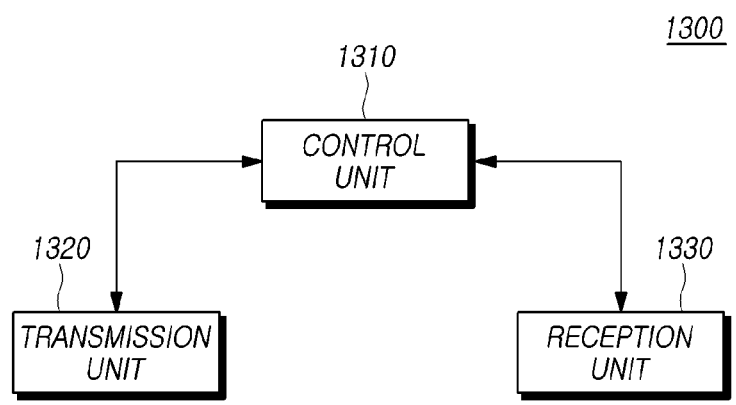
FIG. 13 is a diagram illustrating a base station according to an embodiment.

FIG. 13 is a diagram illustrating a base station 1300 according to a further an embodiment.

Referring to FIG. 13, the base station 1300 according to an embodiment includes a control unit 1310, a transmission unit 1320, and a reception unit 1330.

The control unit 1310 controls an overall operation of the base station 1300 according to a method of receiving uplink control information using a base station required for performing the present invention described above. The transmission unit 1320 and the reception unit 1330 are used for transmitting/receiving signals, messages, and data required for performing the present invention described above to/from a UE.

The transmission unit 1320 may transmit configuration information of a slot-based PUCCH resource set and a subslot-based PUCCH resource set to the UE (S1100).

The control unit 1310 may configure a PUCCH resource set to be used for transmitting uplink control information to the UE. For example, in order to transmit HARQ ACK/NACK feedback information for a PDSCH received from the base station, a PUCCH resource set configured by one or more PUCCH resources may be configured for the UE.

For example, separately from the setting of such a PUCCH resource set, a PUCCH resource set for an intra-slot PUCCH repetition may be additionally configured. In other words, the control unit 1310 may additionally set a PUCCH resource set for activating an intra-slot PUCCH repetition for the UE through higher layer signaling in addition to the typical PUCCH resource set.

The transmission unit 1320 may transmit configuration information of the slot-based PUCCH resource set and configuration information of the subslot-based PUCCH resource set to the UE. For example, the transmission unit 1320 may configure an additional subslot-based PUCCH resource set in accordance with whether the PUCCH transmission type of the UE is the typical slot-based PUCCH transmission or the subslot-based PUCCH repetitive transmission and transmit the configured subslot-based PUCCH resource set to the UE through higher layer signaling.

In this case, the configuration information of the subslot-based PUCCH resource set may additionally include repetition times setting information for the transmission of the uplink control information in addition to the PUCCH resource setting information configuring the slot-based PUCCH resource set.

Alternatively, the configuration information of the subslot-based PUCCH resource set may include information of the number of subslots configured within one slot. In other words, the number or the length of uplink subslots within one slot for the UE may be UE-specifically semi-statically configured. Additional time section or frequency section allocation information may be included in one intra-slot PUCCH repletion resource setting for each intra-slot PUCCH repetition. In other words, each slot may be divided into subslots for an intra-slot PUCCH repetition, and PUCCH resource allocation information may be configured for each subslot.

The transmission unit 1320 may transmit information indicating the subslot-based uplink control channel resource set to the UE.

For example, the transmission unit 1320 may transmit intra-slot PUCCH repetition indication information to the UE through explicit higher layer signaling as the information indicating a subslot-based uplink control channel resource set. For example, the transmission unit 1320 may semi-statically set the intra-slot PUCCH repetition indication information through UE-specific RRC signaling or may activate or deactivate an intra-slot PUCCH repetition through MAC CE signaling.

Alternatively, the transmission unit 1320 may transmit intra-slot PUCCH repetition indication information through a DCI format used for transmitting the PDSCH resource allocation information as information indicating a subslot-based uplink control channel resource set. In other words, an information region used for indicating activation/deactivation of the intra-slot PUCCH repetition may be included in a DL assignment DCI format used for transmitting the PDSCH resource allocation information. The transmission unit 1320 may dynamically indicate activation/deactivation of the intra-slot PUCCH repetition through the information region.

For example, information indicating a subslot-based uplink control channel resource set may be configured on the basis of a downlink control channel search space or a RNTI and be implicitly indicated. In other words, the transmission unit 1320 may transmit information relating to a CORESET, a search space, or information relating to a RNTI as information indicating a subslot-based uplink control channel resource set.

More specifically, when a CORESET or a search space is configured, setting information for a PUCCH transmission type for PDSCH allocation through the CORESET or the search space may be included. Here, the PUCCH transmission type may be divided into slot-based PUCCH transmission or subslot-based PUCCH transmission. In this case, through this, activation/deactivation of the intra-slot PUCCH repetition may be determined in accordance with the CORESET or the search space through which a DCI format including PDSCH resource allocation information is transmitted.

Alternatively, it may be configured such that the intra-slot PUCCH repetition is activated in a case in which an RNTI applied to CRC scrambling of the DCI format including the resource allocation information for the PDSCH is an MCS-C-RNTI. Otherwise, the intra-slot PUCCH repetition is deactivated. Alternatively, by allocating an additional new RNTI used for the activation of the intra-slot PUCCH repetition, PDSCH transmission resource allocation for which activation of the intra-slot PUCCH repetition is necessary may be configured to be transmitted through CRC scrambling based on the new RNTI.

The reception unit 1330 may repetitively receive uplink control information within one slot using an uplink control channel resource of the subslot-based uplink control channel resource set.

As one example, in a case in which the transmission unit 1320 indicates PUCCH resource allocation information through a PUCCH resource indicator of the DCI format, the UE may analyze the PUCCH resource allocation information on the basis of the activation/deactivation of the intra-slot PUCCH repetition. In other words, in a case in which deactivation of the intra-slot PUCCH repetition is indicated or set, the transmission unit 1320 may indicate PUCCH resource allocation information on the basis of the type-1 PUCCH resource set. In accordance with this, the reception unit 1330 may receive uplink control information transmitted by the UE using a PUCCH resource.

Differently from this, in a case in which activation of the intra-slot PUCCH repetition is indicated or set, the transmission unit 1320 may indicate PUCCH resource allocation information on the basis of the new type-2 PUCCH resource set. In accordance with this, the reception unit 1330 may repetitively receive the uplink control information that has been repetitively transmitted for each subslot within one slot by the UE using the PUCCH resource.

As described, the method and apparatus according to the embodiments of the present disclosure improves reliability of an uplink control channel in accordance with repetitive transmission of uplink control information.

The embodiments described above may be supported by standard documents disclosed in at least one of IEEE 802, 3GPP, and 3GPP2 that are radio connection systems. In other words, steps, configurations, and parts that have not been described for clearly disclosing the present technical idea in these embodiments can be supported by the standard documents described above. In addition, all the terms disclosed here can be described using the standard documents disclosed above.

These embodiments described above may be realized by various means. For example, these embodiments may be realized by hardware, firmware, software, a combination thereof, or the like.

In the case of realization by hardware, methods according to these embodiments may be realized by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case of realization by firmware or software, methods according to these embodiments may be realized in the form of devices, processes, functions, or the like performing the functions or the operations described above. A software code may be stored in a memory unit and be driven by a processor. The memory unit described above is positioned inside or outside the processor and can transmit/receive data to/from the processor using various means that have already been known.

In addition, the term such as "system", "processor", "controller", "component", "module", "interface", "model", "unit", or the like described above, generally, may represent computer-related entity hardware, a combination of hardware and software, software, or software that is in the middle of execution. For example, the constituent element described above may be a process driven by a processor, a processor, a controller, a control processor, an entity, an execution thread, a program and/or a computer but are not limited thereto. For example, a controller or an application being executed by a processor and a controller or a processor may be a constituent element. One or more constituent elements may be present inside a processor and/or an execution thread, and the constituent elements may be positioned in one device (for example, a system, a computing device, or the like) or may be distributed and positioned in two or more devices.

The above description is only exemplary description of the technical idea of the present disclosure, and various modifications and changes can be made by those skilled in the art in a range not departing from essential features of the present technical idea. In addition, these embodiments are not for limiting the technical idea of the present disclosure but for description thereof, and thus, the scope of the present technical idea is not limited to such embodiments. The scope of protection of the present disclosure should be construed based on the following claims, and all technical ideas within the scope of equivalents thereof should be construed as being included within the scope of the present disclosure.

What is claimed is:

1. A method of transmitting uplink control information by a user equipment (UE), the method comprising:
   configuring, by the UE, a first hybrid automatic repeat request-acknowledgement (HARQ-ACK) codebook and a second HARQ-ACK codebook simultaneously;
   receiving, by the UE, first physical uplink control channel (PUCCH) resource set information corresponding to the first HARQ-ACK codebook and second PUCCH resource set information corresponding to the second HARQ-ACK codebook;

receiving, by the UE, subslot related indication information;

receiving, by the UE, a physical downlink shared channel (PDSCH); and in response to the reception of the PDSCH, transmitting, by the UE, uplink control information comprising HARQ feedback information based on the subslot related indication information using an PUCCH resource, wherein the PUCCH resource is determined from one of the first PUCCH resource set information and the second PUCCH resource set information, wherein the PDSCH is associated with a PDSCH group identity (ID), wherein the PDSCH group ID indicated by a radio resource control (RRC) signaling, is used for the transmission of the uplink control information comprising the HARQ feedback information, and wherein the subslot related indication information is received through a UE-specific RRC signaling.

2. The method according to claim 1, wherein the transmission of the uplink control information is associated with a control resource set (CORESET) for a downlink control information (DCI).

3. The method according to claim 1, wherein the one of the first PUCCH resource set information and the second PUCCH resource set information includes information of the number of subslots configured within one slot.

4. A method of receiving uplink control information by a base station, the method comprising:

transmitting, by the base station, first physical uplink control channel (PUCCH) resource set information and second PUCCH resource set information, wherein the first PUCCH resource set information corresponds to a first hybrid automatic repeat request-acknowledgement (HARQ-ACK) codebook and the second PUCCH resource set information corresponds to a second HARQ-ACK codebook, and wherein the first HARQ-ACK codebook and the second HARQ-ACK codebook are configured simultaneously;

transmitting, by the base station, subslot related indication information;

transmitting, by the base station, a physical downlink shared channel (PDSCH); and in response to the transmission of the PDSCH, receiving, by the base station, uplink control information comprising HARQ feedback information based on the subslot related information using an PUCCH resource, wherein the PUCCH resource is determined from one of the first PUCCH resource set information and the second PUCCH resource set information, wherein the PDSCH is associated with a PDSCH group identity (ID), wherein the PDSCH group ID indicated by a radio resource control (RRC) signaling, is used for the reception of the uplink control information comprising the HARQ feedback information, and wherein the subslot related indication information is transmitted through a UE-specific RRC signaling.

5. The method according to claim 4, wherein the reception of the uplink control information is associated with a control resource set (CORESET) for a downlink control information (DCI).

6. The method according to claim 4, wherein the one of the first PUCCH resource set information and the second PUCCH resource set information includes information of the number of subslots configured within one slot.

7. A user equipment (UE) transmitting uplink control information, the UE comprising:

a reception unit adapted to i) configure a first hybrid automatic repeat request-acknowledgement (HARQ-ACK) codebook and a second HARQ-ACK codebook simultaneously, ii) receive first physical uplink control channel (PUCCH) resource set information corresponding to the first HARQ-ACK codebook and second PUCCH resource set information corresponding to the second HARQ-ACK codebook, iii) receive subslot related indication information, and iv) receive a physical downlink shared channel (PDSCH); and a transmission unit adapted to, in response to the reception of the PDSCH, transmit uplink control information comprising HARQ feedback information based on the subslot related indication information using an PUCCH resource, wherein the PUCCH resource is determined from one of the first PUCCH resource set information and the second PUCCH resource set information, wherein the PDSCH is associated with a PDSCH group identity (ID), wherein the PDSCH group ID indicated by a radio resource control (RRC) signaling, is used for the transmission of the uplink control information comprising the HARQ feedback information, and wherein the subslot related indication information is received through a UE-specific RRC signaling.

8. The UE according to claim 7, wherein the transmission of the uplink control information is associated with a control resource set (CORESET) for a downlink control information (DCI).

9. The UE according to claim 7, wherein the one of the first PUCCH resource set information and the second PUCCH resource set information includes information of the number of subslots configured within one slot.

* * * * *